United States Patent
Watanabe

(10) Patent No.: US 9,615,306 B2
(45) Date of Patent: Apr. 4, 2017

(54) COMMUNICATION APPARATUS, METHOD FOR CONTROLLING THE SAME, AND COMPUTER-READABLE RECORDING MEDIUM

(71) Applicant: CANON KABUSHIKI KAISHA, Tokyo (JP)

(72) Inventor: Hitoshi Watanabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 590 days.

(21) Appl. No.: 14/141,078

(22) Filed: Dec. 26, 2013

(65) Prior Publication Data
US 2014/0185549 A1   Jul. 3, 2014

(30) Foreign Application Priority Data

Dec. 28, 2012   (JP) .................. 2012-286677

(51) Int. Cl.
*H04W 36/36*   (2009.01)
*H04W 48/18*   (2009.01)
*H04W 8/00*   (2009.01)
*H04W 88/04*   (2009.01)

(52) U.S. Cl.
CPC ........... *H04W 36/36* (2013.01); *H04W 48/18* (2013.01); *H04W 8/005* (2013.01); *H04W 88/04* (2013.01)

(58) Field of Classification Search
CPC ..... H04W 36/36; H04W 48/18; H04W 8/005; H04W 88/04
USPC ........................................................ 370/329
See application file for complete search history.

(56) References Cited

U.S. PATENT DOCUMENTS

| | | | |
|---|---|---|---|
| 2003/0096611 A1* | 5/2003 | Cooper ................. | H04W 48/16 455/434 |
| 2006/0239236 A1* | 10/2006 | Otsuka .................. | H04W 28/18 370/338 |
| 2009/0323644 A1 | 12/2009 | Yokota | |
| 2010/0177711 A1 | 7/2010 | Gum | |
| 2010/0284296 A1 | 11/2010 | Sakai | |

(Continued)

FOREIGN PATENT DOCUMENTS

| | | |
|---|---|---|
| CN | 101322432 A1 | 12/2008 |
| EP | 1589703 A2 | 10/2005 |

(Continued)

OTHER PUBLICATIONS

EP 1589703 A2, Oct. 26, 2005, Isaac Lagnado.*

*Primary Examiner* — Peter Cheng
(74) *Attorney, Agent, or Firm* — Canon USA, Inc. IP Division

(57) ABSTRACT

Information on one or more networks in which a communication apparatus has participated before and information on one or more external apparatuses to which the communication apparatus has been connected before are held. Information on a first network previously formed by the communication device and information on a second network previously formed by an external access point are held such that the information on the first network and the information on the second network are identifiable. If it is judged that there is not a network corresponding to the held information on the second network, it is determined to use a network based on the held information on the first network.

19 Claims, 12 Drawing Sheets

(56) References Cited

U.S. PATENT DOCUMENTS

2011/0021195 A1* 1/2011 Cormier ............... H04W 48/18
455/435.2

FOREIGN PATENT DOCUMENTS

| JP | 2012-5136 A | 1/2012 |
|---|---|---|
| RU | 2008137128 A | 3/2010 |
| RU | 2411695 C2 | 2/2011 |
| WO | 2005/002261 A1 | 1/2005 |

* cited by examiner

FIG. 4

| CONNECTED APPARATUS INFORMATION NUMBER | 1 | 2 | 3 | 4 | ... | N |
|---|---|---|---|---|---|---|
| CONNECTION ORDER | 6 | 2 | 5 | – | | – |
| TYPE OF APPARATUS | MOBILE PHONE | MOBILE PHONE | PC | – | | – |
| REGISTRATION NAME | mobilePhone 1 | mobilePhone 2 | PCI | – | | – |
| UUID | 0000-ABCD-EFGH | 0000-1234-5678 | 0011-AAAA-BBBB | – | | – |
| VIEW PERMISSION | PERMITTED | NOT PERMITTED | PERMITTED | – | | – |
| NETWORK FORMATION PARAMETER NUMBER | 1 | – | – | – | | – |

| NETWORK PARTICIPATION PARAMETER NUMBER | 1 | 2 | 3 | 4 | ... | M |
|---|---|---|---|---|---|---|
| CONNECTION ORDER | 6 | 2 | – | – | | – |
| ESSID | NETWORK-100 | NETWORK-101 | – | – | | – |
| AUTHENTICATION SCHEME | WPA2 | WPA | – | – | | – |
| TYPE OF CODE | AES | TKIP | – | – | | – |
| ENCRYPTION KEY | abcdefgh | 12345678 | – | – | | – |
| CHANNEL | 1 | 8 | – | – | | – |
| IP ADDRESS ACQUISITION METHOD | Auto | Auto | – | – | | – |
| DNS ACQUISITION METHOD | Auto | Auto | – | – | | – |

| NETWORK FORMATION PARAMETER NUMBER | 1 | 2 | 3 | 4 | ... | N |
|---|---|---|---|---|---|---|
| ESSID | CAMERA-123 | – | – | – | | – |
| ENCRYPTION KEY | 12345678 | – | – | – | | – |

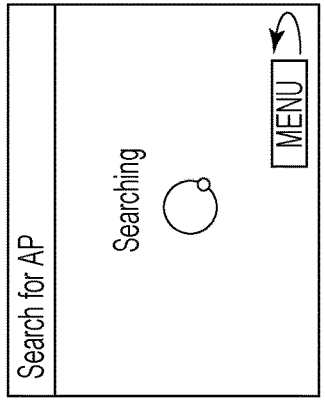
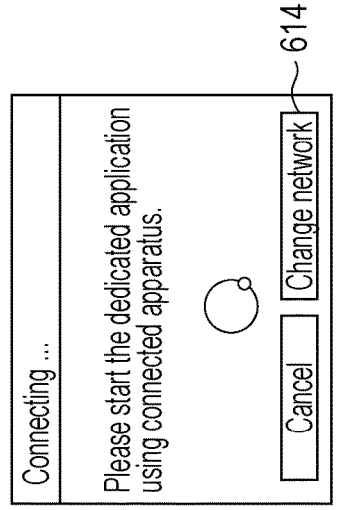
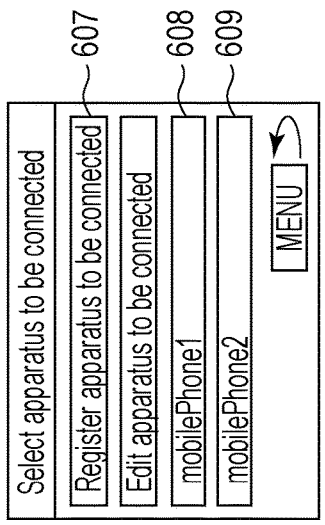
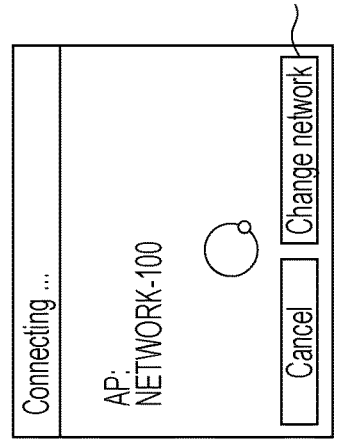
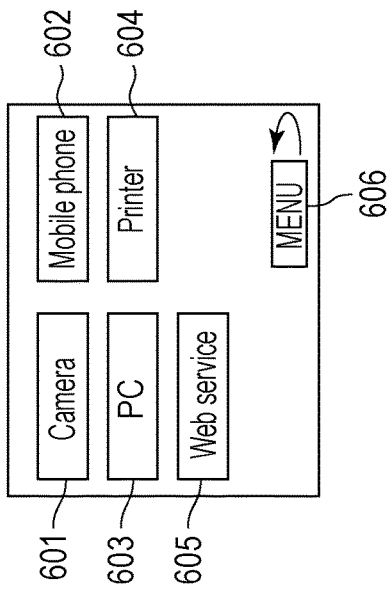
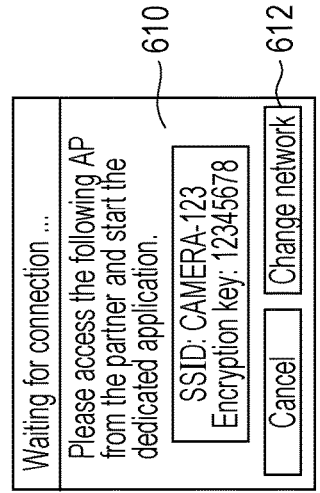

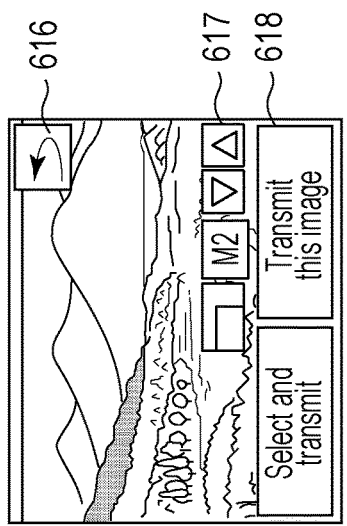
FIG. 6I
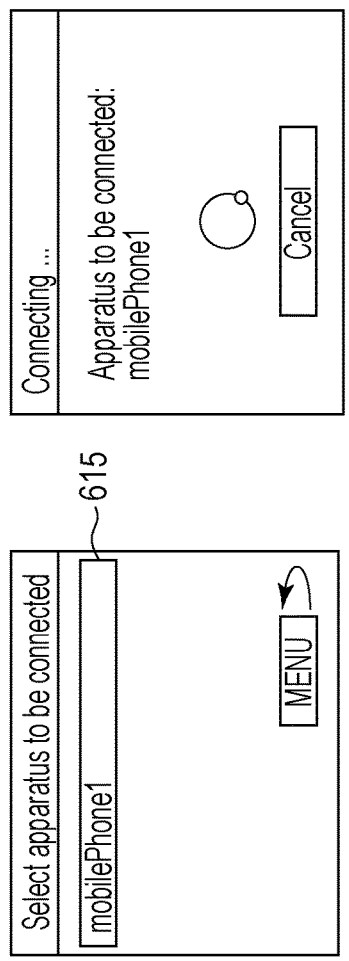
FIG. 6H
FIG. 6G
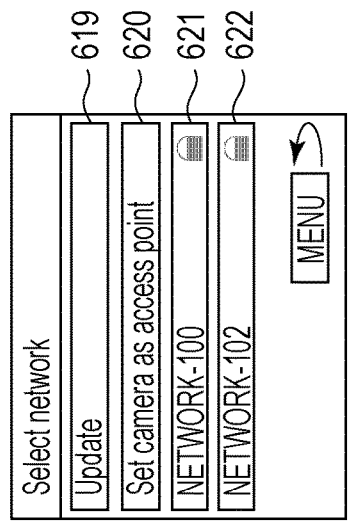
FIG. 6J

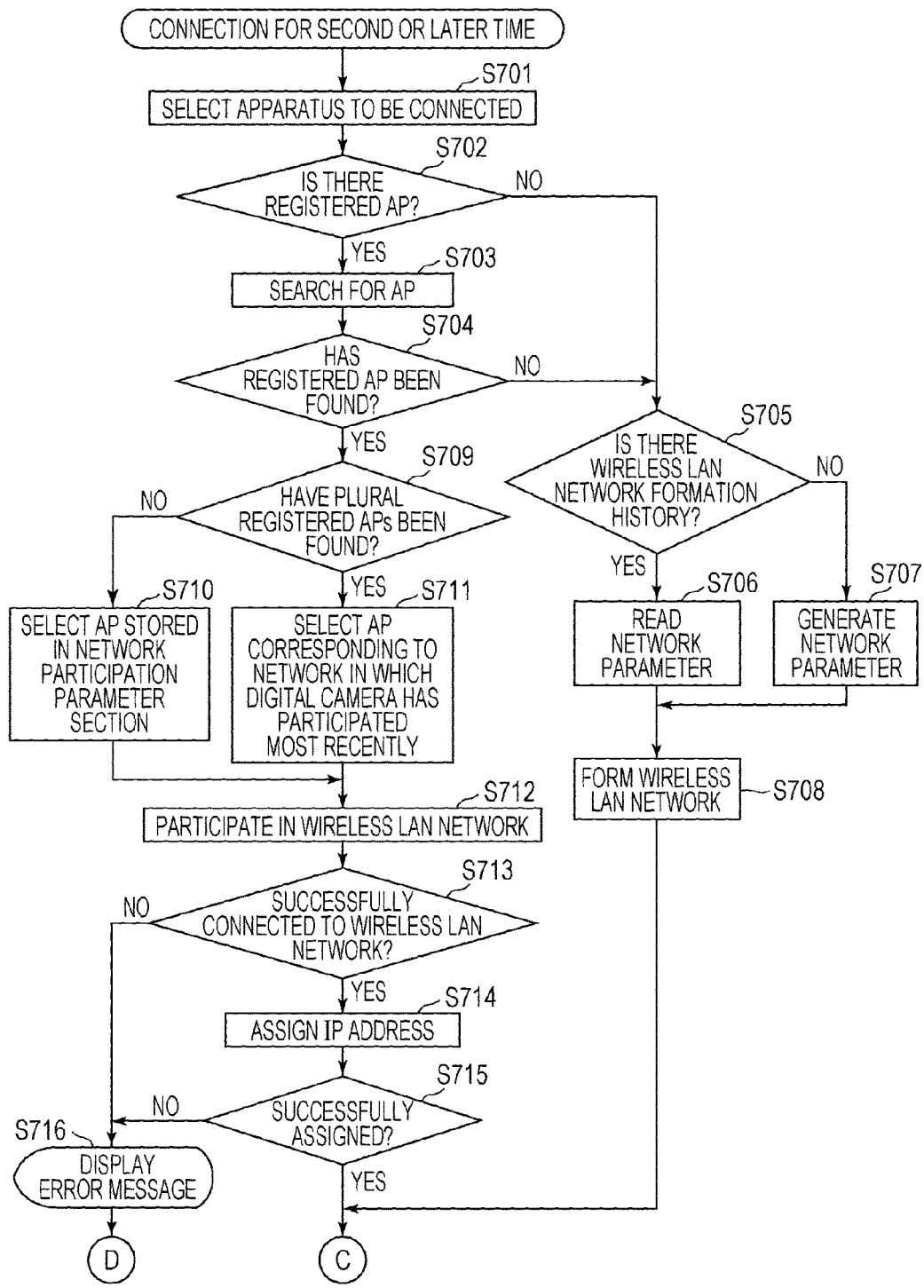

COMMUNICATION APPARATUS, METHOD FOR CONTROLLING THE SAME, AND COMPUTER-READABLE RECORDING MEDIUM

BACKGROUND OF THE INVENTION

Field of the Invention

The present invention relates to a process of connecting a communication apparatus to a network.

Description of the Related Art

In a typical image capturing apparatus including a wireless communication apparatus mounted therein, such as a digital camera, captured image data is recorded as a file on a recording medium, such as a memory card, included in or loaded to the camera. The image data is in the form of a file, and thus can be easily transmitted and received through communication.

There is known a method for displaying the names of wireless communication apparatuses stored in advance on a display unit in a selectable manner, and displaying information indicating whether or not the wireless communication apparatuses exist in a network on the display unit, in order to easily establish a connection to a desired communication partner. Also, a technique for reestablishing a connection to a desired apparatus using a connection history is available.

Further, there is a wireless communication apparatus having a simplified access point function. When the wireless communication apparatus starts the simplified access point function, another apparatus detects the wireless communication apparatus as an access point and participates in a network formed by the wireless communication apparatus. In this way, even in an environment where there is no wireless networks formed by access points, a connection between wireless communication apparatuses can be established.

SUMMARY OF THE INVENTION

The present invention provides a communication apparatus that is to be connected to an external apparatus via a network. The communication apparatus includes a participation unit configured to participate in a network formed by an external access point; a forming unit configured to form a network, with the communication apparatus as an access point; a holding unit configured to hold information on one or more networks in which the communication apparatus has participated before, information on one or more external apparatuses to which the communication apparatus has been connected before, information on a first network previously formed by the forming unit, and information on a second network previously formed by the external access point such that the information on the first network and the information on the second network are identifiable; an accepting unit configured to accept selection, on the basis of the information on the one or more external apparatuses held by the holding unit, of an external apparatus for which communication via a network is to be established; a judging unit configured to judge, in a case where selection is accepted by the accepting unit, whether or not a network corresponding to the information on the second network held by the holding unit exists; and a determining unit configured to, in a case where the judging unit judges that the network does not exist, determine to use a network based on the information on the first network held by the holding unit.

Further features of the present invention will become apparent from the following description of exemplary embodiments with reference to the attached drawings.

BRIEF DESCRIPTION OF THE DRAWINGS

FIG. 4 is a conceptual diagram of a database held by the communication apparatus according to the first embodiment.

FIGS. 6A to 6J are diagrams illustrating an example of screens that are displayed during processing of the communication apparatus according to the first embodiment.

FIG. 7A is a flowchart illustrating a process performed by the communication apparatus according to the first embodiment.

DESCRIPTION OF THE EMBODIMENTS

Hereinafter, embodiments of the present invention will be described in which a communication apparatus is mounted in an image capturing apparatus, such as a digital camera. The present invention is not limited thereto, and may be applied to an information processing apparatus such as a mobile phone, a portable medium player, a so-called tablet device, and a personal computer.

First Embodiment

Configuration of Image Capturing Apparatus

An overview of the configuration and function of an image capturing apparatus according to a first embodiment of the present invention will be described with reference to FIG. 1.

Figure 1:
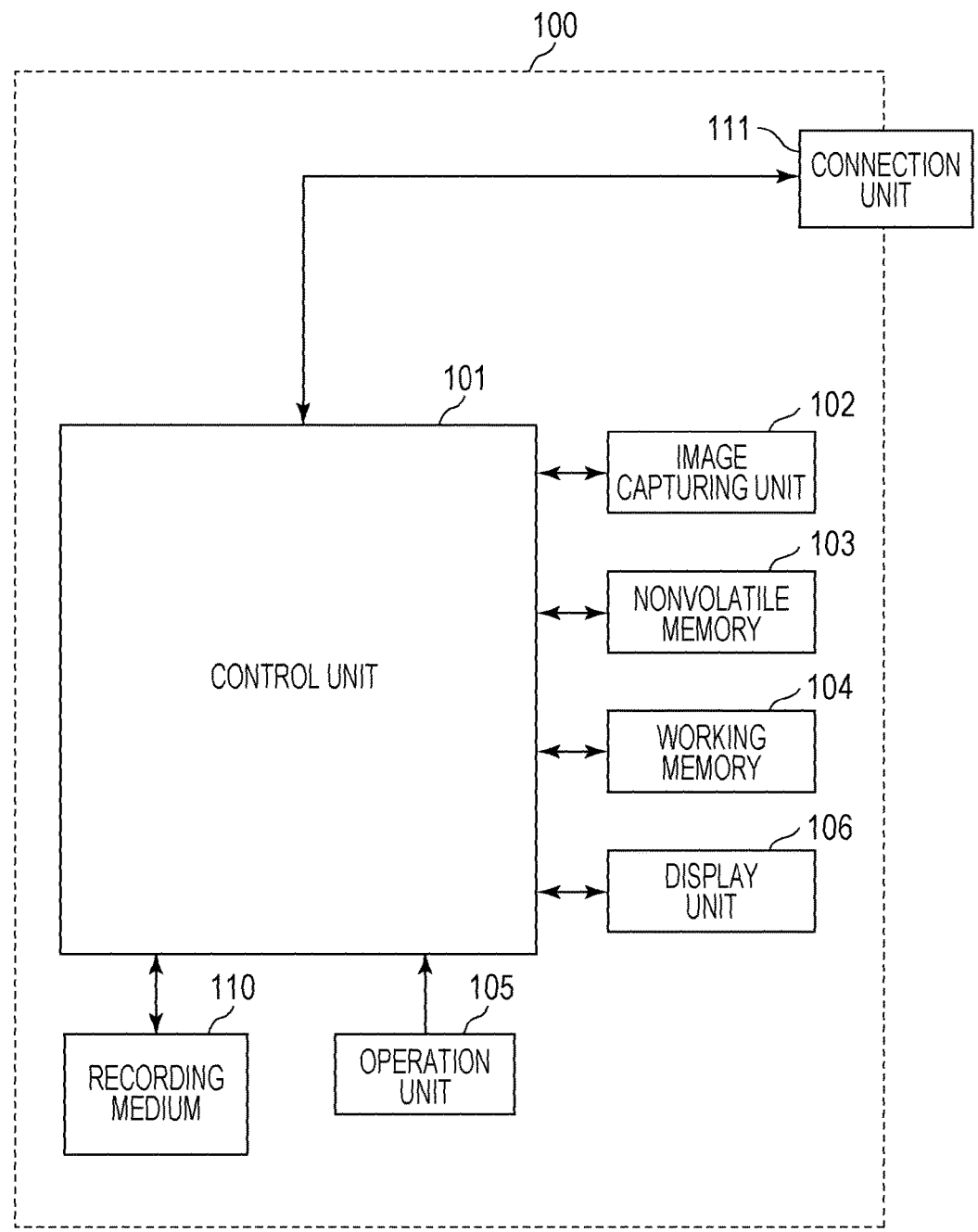
FIG. 1 is a block diagram illustrating the configuration of a communication apparatus according to a first embodiment of the present invention.

Referring to FIG. 1, a control unit 101 controls the individual units of a digital camera 100 in accordance with a signal input thereto and a program described below. The control unit 101 does not necessarily control the entire apparatus, and a plurality of hardware units may share processing to control the entire apparatus.

An image capturing unit 102 converts light of a subject formed by a lens included in the image capturing unit 102 to an electric signal, performs a noise reduction process and so forth, and outputs digital data as image data. The captured image data is stored in a buffer memory, undergoes certain computation in the control unit 101, and is recorded on a recording medium 110.

A nonvolatile memory 103 is an electrically erasable and recordable nonvolatile memory. A program executed by the control unit 101 and described below is stored therein.

A working memory 104 is used as a buffer memory that temporarily stores image data captured by the image capturing unit 102, an image display memory for a display unit 106, a working area for the control unit 101, and so forth.

An operation unit 105 is used for accepting an instruction for the digital camera 100 from a user. The operation unit 105 includes, for example, operation members such as a power button for providing, from a user, an instruction to turn ON/OFF the power of the digital camera 100, a release switch for providing an instruction to perform shooting, and a playback button for providing an instruction to play back image data. Also, a touch panel included in a display unit 106, which will be described below, is included in the operation unit 105. The release switch includes a switch SW1 and a switch SW2. When the release switch is in a so-called half-pressed state, the switch SW1 is in an ON-state. In this state, instructions for performing preparation for shooting, such as an auto focus (AF) process, an auto exposure (AE) process, an auto white balance (AWB) process, and a flash preliminary emission (EF) process, are accepted. When the release switch is in a so-called fully-pressed state, the switch SW2 is in an ON-state. In this state, an instruction to perform shooting is accepted.

The display unit 106 displays a viewfinder image during shooting, displays captured image data, and displays characters for an interactive operation screen. The display unit 106 is not necessarily included in the digital camera 100. The digital camera 100 may be connected to the display unit 106 that may be provided inside or outside the digital camera 100, and may have at least a display control function for controlling display on the display unit 106.

The recording medium 110 is capable of storing image data output from the image capturing unit 102. The recording medium 110 may be configured so as to be removable from the digital camera 100, or may be built in the digital camera 100. That is, the digital camera 100 may have at least a unit for accessing the recording medium 110.

A connection unit 111 is an interface that is used for establishing a connection to an external apparatus. The digital camera 100 according to this embodiment is capable of transmitting data to and receiving data from an external apparatus via the connection unit 111. In this embodiment, the connection unit 111 includes an interface that is used for communicating with an external apparatus via a wireless local area network (LAN). The control unit 101 implements wireless communication with an external apparatus by controlling the connection unit 111. The communication scheme used here is not limited to the wireless LAN.

The digital camera 100 according to this embodiment is capable of operating as a slave apparatus in an infrastructure mode of a wireless LAN. In the case of operating as a slave apparatus, the digital camera 100 is capable of participating in a network formed by an access point (hereinafter referred to as an AP) in the surrounding area by establishing a connection to the AP. The digital camera 100 according to this embodiment is a kind of AP, and is also capable of operating as a simplified AP having a more limited function. An AP according to this embodiment is an example of a relay apparatus. If the digital camera 100 operates as a simplified AP, the digital camera 100 forms a network by itself. An apparatus around the digital camera 100 recognizes the digital camera 100 as an AP, and becomes capable of participating in the network formed by the digital camera 100. A program that causes the digital camera 100 to operate in the above-described manner is stored in the nonvolatile memory 103.

Although the digital camera 100 according to this embodiment is a kind of AP, the digital camera 100 is a simplified AP that does not have a gateway function for transferring data received from a slave apparatus to an Internet provider or the like. Thus, even if the digital camera 100 receives data from another apparatus that participates in the network formed by the digital camera 100, the digital camera 100 is incapable of transferring the data to a network such as the Internet. According to another embodiment, the digital camera 100 may have a gateway function.

Configuration of Mobile Phone

The configuration and function of a mobile phone 200 according to the first embodiment of the present invention will be described with reference to FIG. 2. An apparatus to be connected according to an embodiment of the present invention is applied to the mobile phone 200. Hereinafter, a mobile phone will be described as an example of the communication apparatus according to an embodiment of the present invention, but the communication apparatus is not limited thereto. The present invention is also applicable to an information processing apparatus, such as a digital camera having a wireless function, a portable medium player, a so-called tablet device, a personal computer, and a smart phone.

Figure 2:
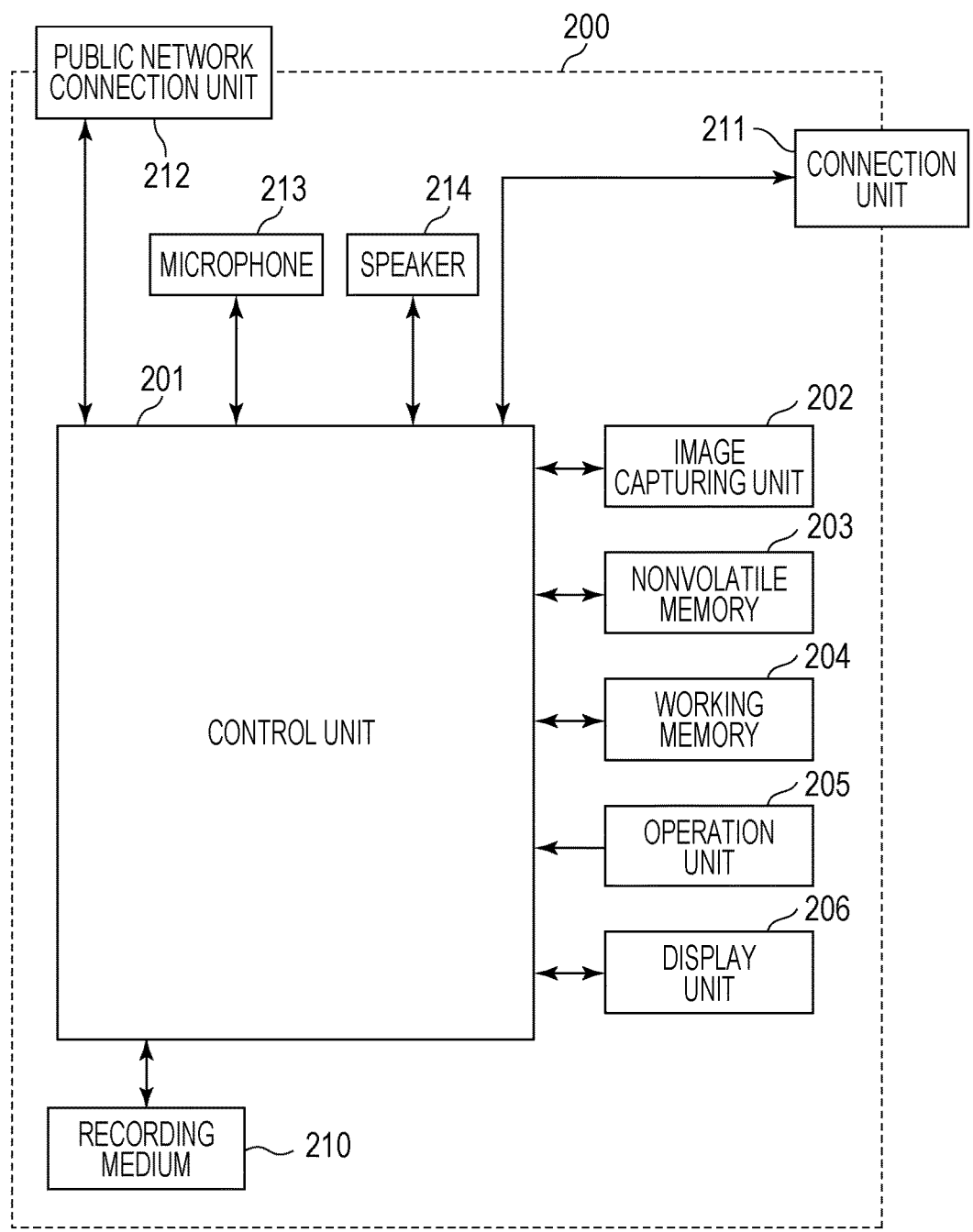
FIG. 2 is a block diagram illustrating the configuration of a mobile phone according to the first embodiment.

Referring to FIG. 2, a control unit 201 controls the individual units of the mobile phone 200 in accordance with a signal input thereto and a program described below. The control unit 201 does not necessarily control the entire apparatus, and a plurality of hardware units may share processing to control the entire apparatus.

An image capturing unit 202 converts light of a subject formed by a lens included in the image capturing unit 202 to an electric signal, performs a noise reduction process and so forth, and outputs digital data as image data. The captured image data is stored in a buffer memory, undergoes certain computation in the control unit 201, and is recorded on a recording medium 210.

A nonvolatile memory 203 is an electrically erasable and recordable nonvolatile memory. Various programs or the like executed by the control unit 201 are stored therein. A program for communicating with the digital camera 100 is also held in the nonvolatile memory 203, and is installed as a camera communication application. The processing performed by the mobile phone 200 according to this embodiment is implemented by reading a program provided by the camera communication application. The camera communication application includes a program for utilizing a basic function of an operating system (OS) installed in the mobile phone 200. The OS of the mobile phone 200 may have a program for implementing the processing according to this embodiment.

A working memory 204 is used as a buffer memory that temporarily stores image data generated by the image capturing unit 202, an image display memory for a display unit 206, a working area for the control unit 201, and so forth.

An operation unit 205 is used for accepting an instruction for the mobile phone 200 from a user. The operation unit 205 includes, for example, operation members such as a power button for providing, from a user, an instruction to turn ON/OFF the power of the mobile phone 200, and a touch panel included in the display unit 206.

The display unit 206 displays image data, and displays characters for an interactive operation. The mobile phone 200 does not necessarily include the display unit 206. The mobile phone 200 may be capable of connecting to the display unit 206 and have at least a display control function for controlling display on the display unit 206.

The recording medium 210 is capable of storing image data output from the image capturing unit 202. The recording medium 210 may be configured so as to be removable from the mobile phone 200, or may be built in the mobile phone 200. That is, the mobile phone 200 may have at least a unit for accessing the recording medium 210.

A connection unit 211 is an interface that is used for establishing a connection to an external apparatus. The mobile phone 200 according to this embodiment is capable of transmitting data to and receiving data from an external apparatus via the connection unit 211. In this embodiment, the connection unit 211 includes an interface that is used for communicating with an external apparatus via a wireless LAN. The control unit 201 implements wireless communication with an external apparatus by controlling the connection unit 211. The mobile phone 200 according to this embodiment is at least capable of operating as a slave apparatus in an infrastructure mode, and participating in a network formed by an AP in the surrounding area.

A public network connection unit 212 is an interface that is used for performing public wireless communication. The mobile phone 200 is capable of performing voice communication and data communication with another apparatus via the public network connection unit 212. In the case of voice communication, the control unit 201 inputs and outputs voice signals via a microphone 213 and a speaker 214. In this embodiment, the public network connection unit 212 includes an interface for performing communication using a 3rd generation communication scheme. Instead of the 3rd generation communication scheme, another communication scheme, such as long term evolution (LTE), worldwide interoperability for microwave access (WiMAX), asymmetric digital subscriber line (ADSL), fiber to the home (FTTH), and a so-called 4th generation communication scheme, may be used. Further, the connection unit 211 and the public network connection unit 212 are not necessarily constituted by independent hardware units, and may be integrated into a single antenna.

System Configuration

A system configuration in which the digital camera 100 and the mobile phone 200 according to this embodiment are connected to each other will be described with reference to FIGS. 3A and 3B.

Figure 3A:
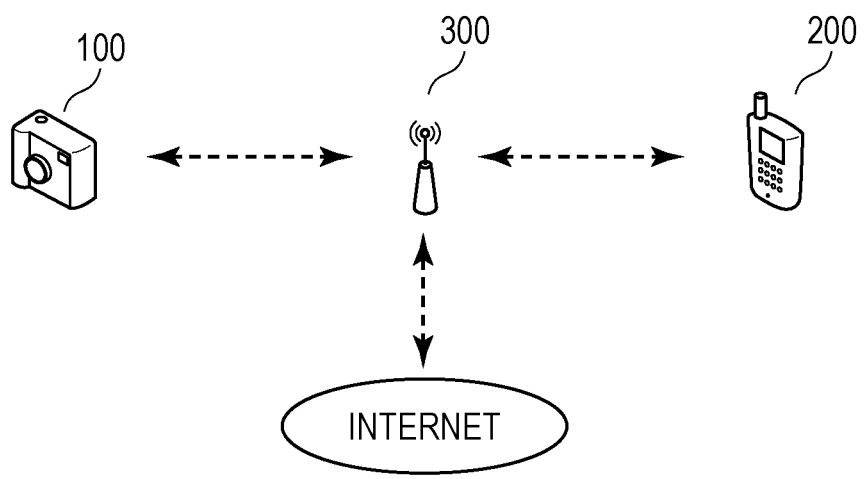
FIGS. 3A and 3B are diagrams illustrating network configurations according to the first embodiment.
Figure 3B:

In a case where the digital camera 100 and the mobile phone 200 transmit and receive data via a wireless LAN, the following two data communication modes illustrated in FIGS. 3A and 3B are available.

FIG. 3A illustrates a first data communication mode in which the digital camera 100 and the mobile phone 200 participate in a wireless LAN network formed by an external AP 300, which is an example of an external relay apparatus. The digital camera 100 and the mobile phone 200 detect a beacon signal that is regularly transmitted by the external AP 300, and participate in the wireless LAN network formed by the external AP 300. After participating in the same wireless LAN network, the digital camera 100 and the mobile phone 200 find each other, acquire information on the ability of each other, and become capable of transmitting and receiving data via the wireless LAN (a connection between the apparatuses is established).

The external AP 300 according to this embodiment is capable of connecting to an external network, such as the Internet, by using a public network or the like. Thus, the mobile phone 200 is capable of transmitting data to the Internet via the external AP 300.

FIG. 3B illustrates a second data communication mode in which the digital camera 100 and the mobile phone 200 are directly connected to each other without via the external AP 300. In this case, the digital camera 100 operates as a simplified AP and forms a wireless LAN network. Operating as a simplified AP, the digital camera 100 starts regularly transmitting a beacon signal. The mobile phone 200 detects the beacon signal, and participates in the wireless LAN network formed by the digital camera 100. As in the case illustrated in FIG. 3A, the digital camera 100 and the mobile phone 200 find each other, acquire information on the ability of each other to establish a connection, and become capable of transmitting and receiving data.

As described above, the digital camera 100 according to this embodiment does not have a function of communicating with an external network, such as the Internet. Thus, the mobile phone 200 that participates in the wireless LAN network formed by the digital camera 100 is incapable of transmitting data to the Internet or the like via the simplified AP.

As described above, the digital camera 100 and the mobile phone 200 communicate in the two data communication modes. In this embodiment, a description will be given of an example in which appropriate control is performed in accordance with these data communication modes.

Data Structure of Connection History

A database held by the digital camera 100 according to this embodiment will be described with reference to FIG. 4.

In a case where the digital camera 100 establishes a connection with a partner apparatus, the digital camera 100 first participates in a network (here, a case where the digital camera 100 serves as a simplified AP and forms a network is included), and then establishes a connection with the partner apparatus. In this embodiment, information on a network and information on a partner apparatus are managed using separate databases. A database held by the digital camera 100 according to this embodiment includes a connected apparatus information section 410, a network participation parameter section 420, and a network formation parameter section 430.

The connected apparatus information section 410 stores information for managing partner apparatuses for which the digital camera 100 has established a connection before via a network. The information stored in the connected apparatus information section 410 is an example of history information stored in a first storage unit. The connected apparatus information section 410 stores "connected apparatus information number", "connection order", "type of apparatus", "registration name", "UUID", "view permission setting", and "network formation parameter number", which are given to each piece of connected apparatus information. Here, "connection order" represents the order in which the digital camera 100 established a connection to apparatuses represented by the information stored in the connected apparatus information section 410 in the past. A larger number represents an apparatus that has been connected more recently. "Registration name" is the name of a connected apparatus that can be set by a user, and can be freely changed so that the user is capable of identifying the connected apparatus. "Type of apparatus", "registration name", and "UUID" are not necessarily separate pieces of information. For example, these pieces of information may be specified using a single ID in which a type, a name, and a unique character string are combined. "Network formation parameter number" represents which parameter in the network formation parameter section 430 was used to form a network. N pieces of connected apparatus information may be stored in the connected apparatus information section 410. To store more information, it is necessary to delete one or more pieces of connected apparatus information that are already stored. A piece of connected apparatus information may be deleted in response to an operation performed by the user of the digital camera 100. When more information is to be stored in a state where N pieces of information are already stored, the piece of connected apparatus information having the smallest value may be deleted by referring to "connection order".

The network participation parameter section 420 stores information for managing networks in which the digital camera 100 has participated before and which have been formed by external APs or the like. The information stored in the network participation parameter section 420 is an example of history information stored in a second storage unit. The network participation parameter section 420 stores "network participation parameter number", "connection order", "ESSID", "authentication scheme", "type of code", "encryption key", "channel", "IP address acquisition method", and "DNS acquisition method", which are given to each network participation parameter. Here, "connection order" represents the order in which the digital camera 100 participated in wireless networks represented by the information stored in the network participation parameter section 420 in the past. A larger number represents a network in which the digital camera 100 has participated more recently. M parameters may be stored in the network participation parameter section 420. To store more parameters, it is necessary to delete one or more parameters that are already stored in the network participation parameter section 420. A parameter in the network participation parameter section 420 may be deleted in response to an operation performed by the user of the digital camera 100. Alternatively, when a parameter is to be newly stored in a state where M parameters are already stored, the parameter having the smallest number may be deleted by referring to "connection order". In a case where the digital camera 100 forms a network while serving as a simplified AP, the information thereon is managed in the network formation parameter section 430 described below, as information distinguishable from the information in the network participation parameter section 420.

The network formation parameter section 430 manages information on networks formed by the digital camera 100 serving as a simplified AP. The network formation parameter section 430 stores "network formation parameter number", "ESSID", and "encryption key", which are given to each network formation parameter. The network formation parameter section 430 may store information on an authentication scheme, a type of code, a channel, an IP address acquisition method, a DNS acquisition method, and so forth, but an item common to all the networks formed by the digital camera 100 is not necessarily stored. The network formation parameter section 430 is capable of storing N parameters, the number of which is the same as the number of pieces of information stored in the connected apparatus information section 410. In a case where a piece of information in the connected apparatus information section 410 is deleted, the parameter associated therewith in the network formation parameter section 430 is deleted, so that more than N parameters are not stored in the network formation parameter section 430.

The database held by the digital camera 100 may be used by being moved by the control unit 101 from the nonvolatile memory 103 to the working memory 104. The following description will be given under the assumption that the database held by the digital camera 100 is in the working memory 104.

Apparatus Registration Process

Figure 5A:
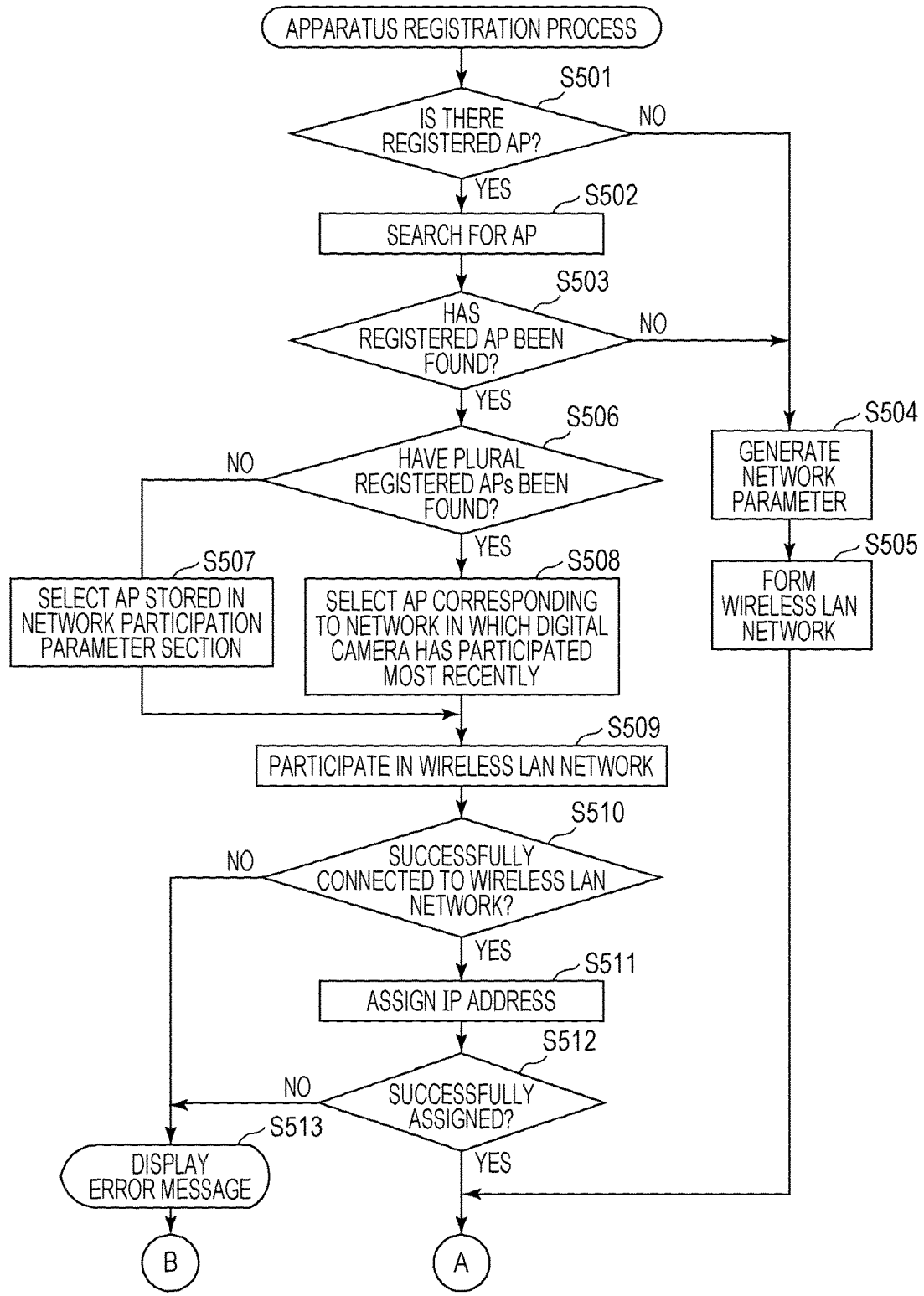
FIG. 5A is a flowchart illustrating a process performed by the communication apparatus according to the first embodiment.
Figure 5B:
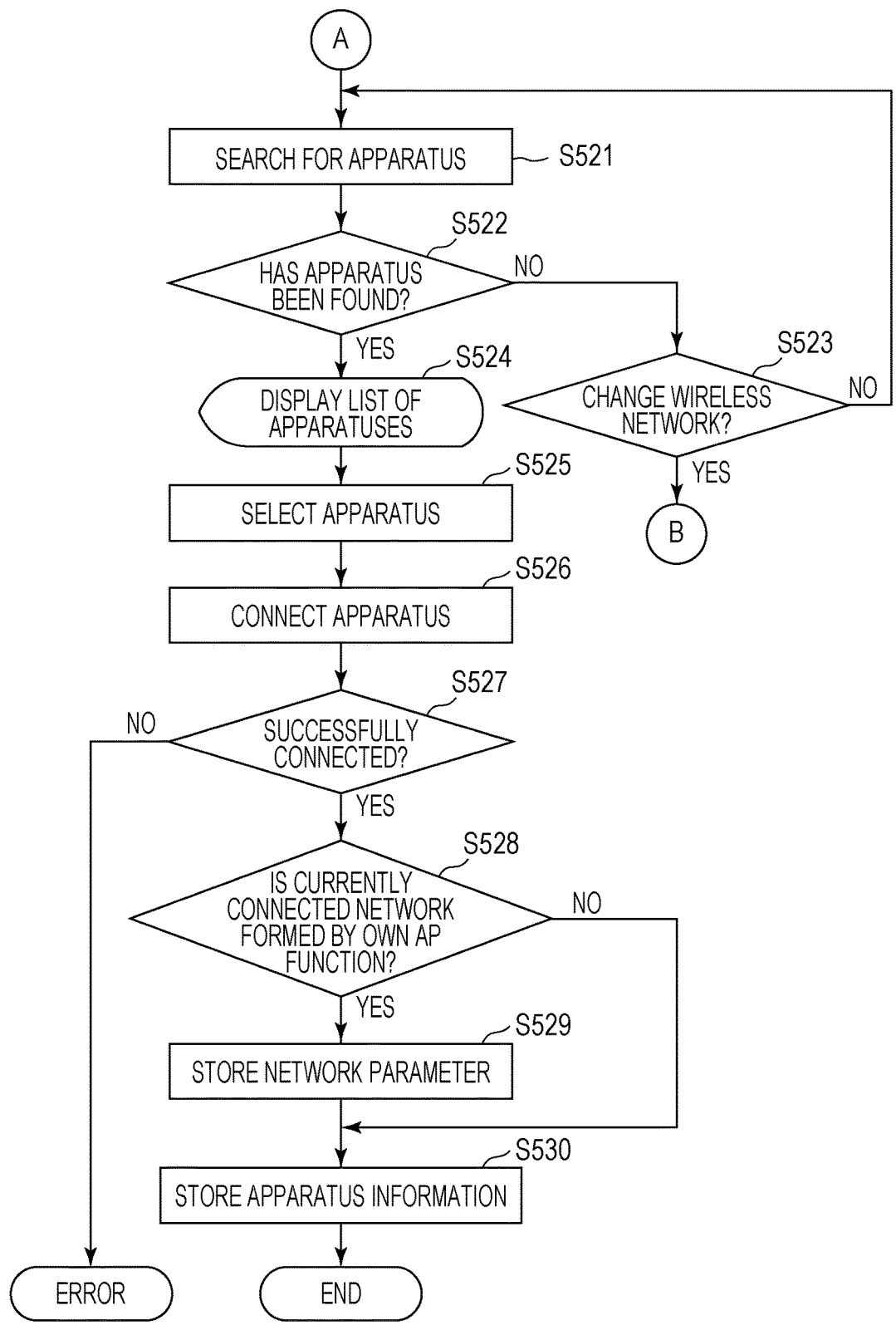
FIG. 5B is a flowchart illustrating a process performed by the communication apparatus according to the first embodiment.
Figure 5C:
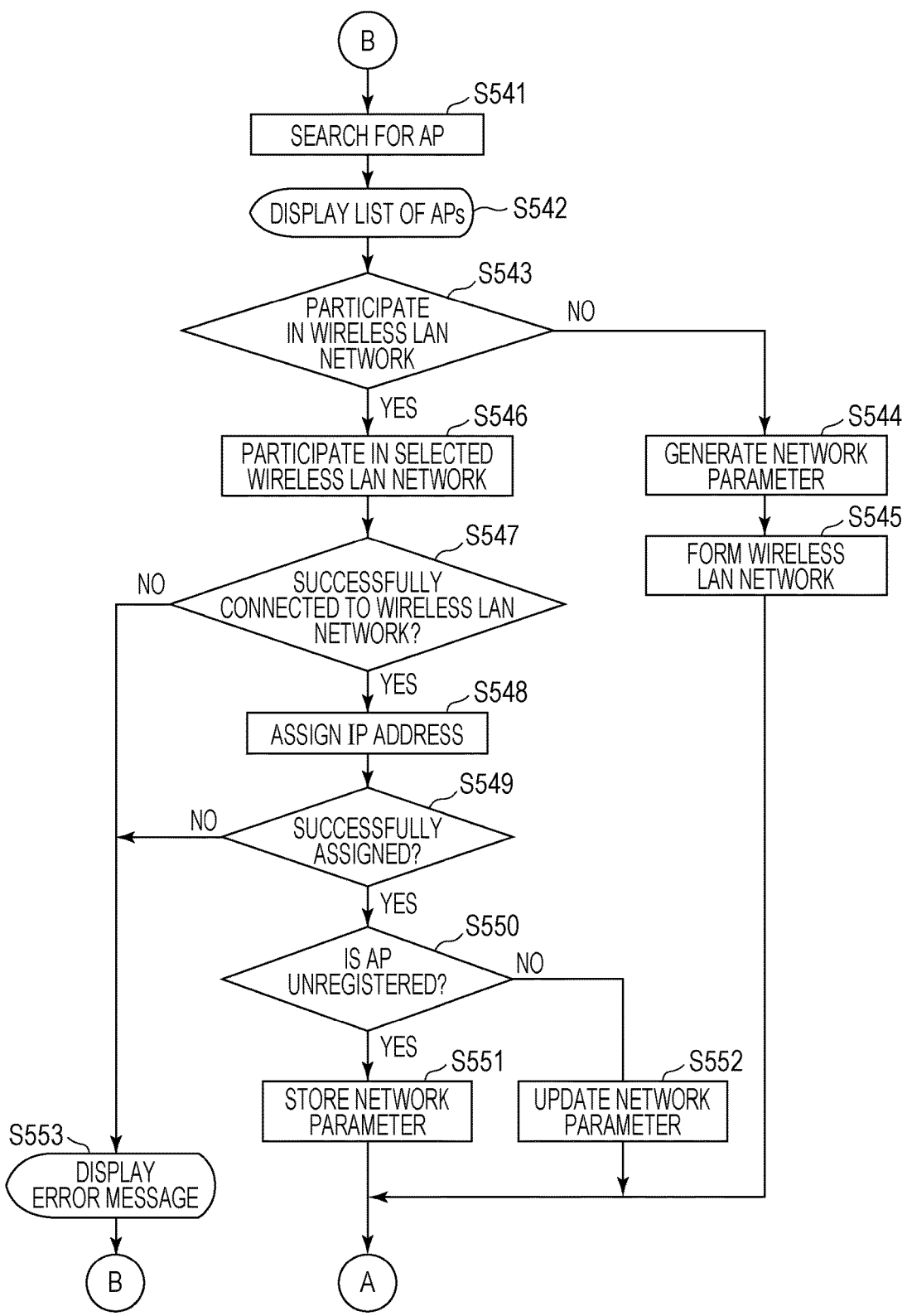
FIG. 5C is a flowchart illustrating a process performed by the communication apparatus according to the first embodiment.

With reference to FIGS. 5A to 5C, a description will be given of a process performed by the digital camera 100 according to this embodiment in a case where the digital camera 100 communicates with a communication apparatus including the mobile phone 200 for the first time. The process described below is implemented by the control unit 101 of the digital camera 100 that controls the individual units of the digital camera 100 in accordance with an input signal and a program. Unless otherwise specified, this is the same in the other flowcharts illustrating processes performed by the digital camera 100. This process starts when the user of the digital camera 100 provides an instruction to establish a connection with another apparatus by operating a menu or the like.

FIG. 6A illustrates an example of a user interface (UI) screen that is displayed on the display unit 106 when a process of establishing a connection to an apparatus is started. The user of the digital camera 100 selects, as a type of apparatus to be connected, a "camera" button 601, a "mobile phone" button 602, a "PC" button 603, a "printer" button 604, a "web service" button 605, or the like. If a "menu" button 606 is selected, the screen returns to the preceding screen. In this embodiment, a description will be given of a case where the "mobile phone" button 602 is selected.

FIG. 6B illustrates an example of a UI screen that is displayed on the display unit 106 after the type of apparatus to be connected has been selected by the user of the digital camera 100, at the time of selecting an apparatus registration process or a second or more connection process. The user of the digital camera 100 selects a "register apparatus to be connected" button 607 to register the apparatus of the type, or selects a button 608 or 609 representing an already registered apparatus to perform a process of establishing a connection with the apparatus for a second or later time.

With reference to FIG. 5A, a description will be given of an apparatus registration process (participation in/formation of a network) that is performed by the digital camera 100 in a case where "register apparatus to be connected" is selected.

Referring to FIG. 5A, in step S501, the control unit 101 judges whether or not a parameter is stored in the network participation parameter section 420. If the control unit 101 judges that a parameter is stored in the network participation parameter section 420, the process proceeds to step S502, and the control unit 101 searches for an AP to participate in a wireless network. If the control unit 101 judges that a parameter is not stored in the network participation parameter section 420, the process proceeds to step S504, and the control unit 101 performs a wireless network formation process.

In step S502, the control unit 101 controls the connection unit 111, and thereby searches for an AP existing in the surrounding area. FIG. 6C illustrates an example of a screen that is displayed on the display unit 106 while an AP is being searched for.

In step S503, the control unit 101 judges whether or not an AP whose parameter is stored in the network participation parameter section 420, that is, a registered AP, is found in the AP searching in step S502. If the control unit 101 judges that an AP is found, the process proceeds to step S506. If the control unit 101 judges that an AP is not found, the process proceeds to step S504, and the control unit 101 performs a wireless network formation process by using a simplified AP of the own apparatus. In this embodiment, it is judged through comparison of ESSIDs whether or not an AP whose parameter is stored in the network participation parameter section 420 is found in the AP searching in step S502. Alternatively, the judgment may be performed by using other identifiers, such as BSSIDs.

If the control unit 101 judges in step S501 that a parameter is not stored in the network participation parameter section 420, the process proceeds to step S504 because a registered AP will not be found in step S503 even if AP searching is performed in step S502. Thus, the searching in step S502 is omitted to shorten the time period until a connection is established. Further, in a case where a parameter is not stored in the network participation parameter section 420, it is necessary to select a network and input a parameter to participate in the network, and the operation of the digital camera 100 is complicated. Thus, network formation using a simplified AP, in which the number of operations of inputting parameters is smaller, is preferentially performed.

In step S504, the control unit 101 generates an ESSID, an authentication scheme, a type of code, an encryption key, and a channel that are necessary to form a wireless LAN network. In the case of a new registration process, at least one of an ESSID, an encryption key, an authentication scheme, a type of code, and a channel that are generated by the digital camera 100 according to this embodiment varies each time. In this embodiment, the control unit 101 does not register generated network information in the network formation parameter section 430 in step S504. Registration in the network formation parameter section 430 is performed at the time when a connection to an apparatus is established (described below).

In step S505, the control unit 101 forms a wireless LAN network by using the network parameter generated in step S504. Also, the control unit 101 displays at least an ESSID and an encryption key, which are information necessary for an external apparatus to participate in the network, on the display unit 106. FIG. 6D illustrates an example of a screen that is displayed on the display unit 106 in a connection waiting state. On the screen illustrated in FIG. 6D, an ESSID has been set to "CAMERA-123" and an encryption key has been set to "12345678" as indicated by a dialog 610. The user of an external apparatus is capable of easily participating in the network formed by the digital camera 100 by seeing the display. Further, in step S505, an IP address is assigned and a subnet is set to enable communication with another apparatus, and the process proceeds to step S521.

Next, a description will be given of a case where the process proceeds from step S503 to step S506. In step S506, the control unit 101 judges whether or not a plurality of APs whose parameters are stored in the network participation parameter section 420 are found in the AP searching in step S502. If the control unit 101 judges that a plurality of APs are found, the process proceeds to step S508. If the control unit 101 judges that a plurality of APs are not found, the process proceeds to step S507.

In step S507, the control unit 101 selects, from among the APs found in the AP searching in step S502, an AP whose parameter is stored in the network participation parameter section 420, and the process proceeds to step S509.

In step S508, the control unit 101 selects, from among the APs found in the AP searching in step S502, an AP whose parameter is stored in the network participation parameter section 420 and which corresponds to a network in which the digital camera 100 has participated recently, and the process proceeds to step S509. The control unit 101 refers to the "connection order" information in the network participation parameter section 420 and selects the largest value, thereby being capable of selecting the AP corresponding to the network in which the digital camera 100 has participated most recently. For example, it is assumed that three APs, NETWORK-100, NETWORK-101, and NETWORK-102 are found in the AP searching in step S502 in a state where the information illustrated in FIG. 4 is stored in the network participation parameter section 420. In this case, the APs whose parameters are stored in the network participation parameter section 420 are NETWORK-100 stored in a column 421 and NETWORK-101 stored in a column 422. The "connection order" corresponding thereto in the network participation parameter section 420 is "6" for NETWORK-100 and is "2" for NETWORK-101. Thus, NETWORK-100 (in the column 421) having the larger value is selected as the AP corresponding to the network in which the digital camera 100 has participated most recently.

In step S509, the control unit 101 refers to the network participation parameter section 420, and participates in the wireless LAN network corresponding to the AP selected in step S507 or step S508. FIG. 6E illustrates an example of a screen that is displayed on the display unit 106 during a wireless LAN network participation process.

In step S510, the control unit 101 judges whether or not a connection to the wireless LAN network has been successfully established. If the control unit 101 judges that a connection has been successfully established, the process proceeds to step S511. If the control unit 101 judges that establishment of a connection has failed, the process proceeds to step S513, and the control unit 101 displays an error message.

In step S511, the control unit 101 assigns an IP address and sets a subnet by referring to the information on the IP address acquisition method and the DNS acquisition method in the network participation parameter section 420, and the process proceeds to step S512.

In step S512, the control unit 101 judges whether or not the IP address has been successfully assigned. If the control unit 101 judges that the IP address has been successfully assigned, the process proceeds to step S521, and the control unit 101 performs an apparatus search process. If the control unit 101 judges that assignment of the IP address has failed, the process proceeds to step S513, and the control unit 101 displays an error message.

In step S513, the control unit 101 displays, on the display unit 106, a message indicating that establishment of a connection to the wireless LAN network has failed, or a message indicating that assignment of the IP address has failed. If the control unit 101 receives, from the user of the digital camera 100, a notification indicating that the error message has been read, the process proceeds to step S541. This is the process performed by the digital camera 100 to participate in a network.

With reference to FIG. 5B, a description will be given of an apparatus registration process (a process of establishing a connection to an apparatus) performed by the digital camera 100 will be described.

Referring to FIG. 5B, in step S521, the control unit 101 searches for a connectable apparatus in the same network. The control unit 101 performs searching by using the simple service discovery protocol (SSDP), the multicast domain name service (mDNS), or the like, and detects a service reported by the mobile phone 200. In this embodiment, a user on the mobile phone 200 side also performs a certain operation here, so that a state occurs in which the mobile phone 200 can be searched for by the digital camera 100. In this embodiment, a certain communication application is started, so that a state occurs in which the mobile phone 200 can be searched for by the digital camera 100. FIGS. 6D and 6F illustrate an example of screens that are displayed on the display unit 106 while an apparatus is being searched for. FIG. 6D illustrates an example of a screen in a case where a wireless LAN network is formed by using the simplified AP function of the digital camera 100. The control unit 101 displays, on the display unit 106, the SSID and encryption key of the formed wireless network, and a message that prompts the user to start the application of the mobile phone 200, as shown in an area 610. FIG. 6F illustrates an example of a screen in a case where the digital camera 100 has participated in a wireless LAN network formed by an external AP. This screen is displayed as a result of shift from the screen illustrated in FIG. 6E. The control unit 101 displays, on the display unit 106, a message that prompts the user to start the application of the mobile phone 200. Accordingly, when the user starts the application of the mobile phone 200, the mobile phone 200 transmits a service notification to the connected network. Thus, the digital camera 100 becomes capable of searching for the mobile phone 200.

In step S522, the control unit 101 judges whether or not a connectable apparatus has been found. If the control unit 101 judges that a connectable apparatus has been found, the process proceeds to step S524, and the control unit 101 displays a list of one or more apparatuses that have been found. If the control unit 101 judges that a connectable apparatus has not been found, the process proceeds to step S523.

In step S523, the control unit 101 judges whether or not an instruction to change the wireless network has been received from the user of the digital camera 100. If the control unit 101 judges that an instruction to change the wireless network has been received, the control unit 101 erases the wireless LAN network that currently exists or withdraws from the current network, and the process proceeds to step S541. If the control unit 101 judges that an instruction to change the wireless network has not been received, the process proceeds to step S521. For example, in FIG. 6D, which illustrates an example of a screen in a case where a wireless LAN network is formed, if a "change network" button 612 is selected, the control unit 101 judges that an instruction to change the wireless network has been received, and erases the current wireless LAN network, and the process proceeds to step S541. In FIG. 6F, which illustrates an example of a screen in a case where the digital camera 100 participates in the wireless LAN network, if a "change network" button 614 is selected, the control unit 101 judges that an instruction to change the wireless network has been received, and withdraws from the current wireless LAN network, and the process proceeds to step S541. Also, if a "change network" button 613 in FIG. 6E, which illustrates an example of a screen that is displayed during a wireless LAN network participation process, is selected, the control unit 101 suspends the wireless LAN network participation process, and the process proceeds to step S541.

In step S524, the control unit 101 displays a list of one or more apparatuses included in the service notification on the display unit 106. FIG. 6G illustrates an example of a screen that is displayed on the display unit 106 and that shows a list of a connectable apparatus. In FIG. 6G, "mobilePhone1" is detected as a connectable apparatus. Also, in this step, a UUID and an apparatus name included in the service notification are stored in the working memory 104 in association with each other.

In this embodiment, an apparatus name and a UUID are included in a service notification. Alternatively, the digital camera 100 that has received a service notification may inquire of the mobile phone 200 about an apparatus name and a UUID. In a case where information on the apparatus to be connected having a UUID included in the service notification is already stored in the connected apparatus information section 410, the registration name stored in the connected apparatus information section 410 may be displayed instead of the apparatus name included in the service notification displayed on the display unit 106.

In step S525, the control unit 101 allows the user of the digital camera 100 to select any one of the apparatus names displayed in a list in step S524. In FIG. 6G, which illustrates an example of a screen displayed in step S524, a connectable apparatus button 615 can be selected. Also, in this step, searching for an apparatus to be connected is continued. If a connectable apparatus is newly detected, the control unit 101 displays an apparatus name included in a service notification on the display unit 106 in the form of a list.

In step S526, the control unit 101 transmits a connection request to the mobile phone 200 by using the UUID of the apparatus selected in step S525, and starts a process for establishing a connection to the selected apparatus, and the process proceeds to step S527. In this embodiment, a connection is established by using the UUID of the apparatus to be connected, but a connection may be established by specifying an IP address or a port number on the basis of the UUID. An IP address may be acquired at the time of performing searching. FIG. 6H illustrates an example of a screen showing an apparatus to be connected and displayed on the display unit 106. On the screen illustrated in FIG. 6H, a connection request is transmitted to "mobilePhone1".

In step S527, the control unit 101 judges whether or not a connection to the selected apparatus has been successfully established. If the control unit 101 judges that a connection has been successfully established, the process proceeds to step S528. If the control unit 101 judges that establishment of a connection has failed, the control unit 101 displays an error message on the display unit 106, and ends the apparatus registration process. FIG. 6I illustrates an example of a screen that is displayed on the display unit 106 when a connection is established. On the screen illustrated in FIG. 6I, a disconnection button 616, a resizing selection button 617, an image transmission button 618, and so forth are displayed. If the disconnection button 616 is selected, a connection to a connected apparatus is disconnected. If the resizing selection button 617 is selected, the setting of resizing can be changed, for example, to "no resizing", "M size", or "S size". If the image transmission button 618 is selected, resizing to the selected size is performed, and an image is transmitted to the connected apparatus.

In step S528, the control unit 101 judges whether or not the wireless LAN network that is currently connected is a network formed by the digital camera 100 by using the own simplified AP function. If the control unit 101 judges that the wireless LAN network is a network formed by the digital camera 100, the process proceeds to step S529.

If the control unit 101 judges that the wireless LAN network is not a network formed by the digital camera 100, the process proceeds to step S530.

In step S529, the control unit 101 stores the parameter of the network formed by the digital camera 100 in the network formation parameter section 430. For example, in a state where nothing is stored in the network formation parameter section 430, in a case where the ESSID of the network formed by the digital camera 100 is "CAMERA-123" and the encryption key is "12345678", the network formation parameter in a column 431 in FIG. 4 is obtained.

The intention of storing a network parameter only in a case where it is judged that the current wireless LAN network is a network formed by the digital camera 100 is as follows. That is, network formation parameters are stored in association with apparatuses to be connected in a one-to-one relationship, and are thus available in a process of establishing a connection for a second or later time. Thus, a parameter is not stored upon formation of a network, but the parameter is stored after a connected apparatus to be associated with is determined. A network parameter is not stored in a case where it is judged that the current wireless LAN network is not a network formed by the digital camera 100, because the network parameter is stored during a network change process, which will be described below.

In step S530, the control unit 101 stores information on the connected apparatus in the connected apparatus information section 410. For example, in a state where information numbers 2 and 3 of connected apparatus information are already registered, in a case where the apparatus for which a connection has been established is "mobilePhone1", connected apparatus information in the column 411 of the connection apparatus information number 1 illustrated in FIG. 4 is obtained. At this time, it is necessary that the connected apparatus information number is different from the connected apparatus information numbers that are already stored. Also, it is necessary to set connection order so that the connection order has a value larger than that of the already stored connected apparatus information. The UUID stored in the working memory 104 in step S524 may be stored, or a UUID may be inquired of the mobile phone 200. A view permission may be selected by the user of the digital camera 100 and may be stored. Alternatively, information representing "permitted" or "not permitted" may be stored as default, and changes may be made later. If the control unit 101 judges in step S528 that the wireless LAN network is a network formed by the digital camera 100, the control unit 101 stores the network formation parameter number stored in step S529. If the control unit 101 judges in step S528 that the wireless LAN network is not a network formed by the digital camera 100, nothing is stored.

With reference to FIG. 5C, a description will be given of an apparatus registration process (a network change process) performed by the digital camera 100.

Referring to FIG. 5C, in step S541, the control unit 101 searches for an AP existing in the surrounding area, and the process proceeds to step S542.

In step S542, the control unit 101 displays, on the display unit 106, a list of one or more ESSIDs included in a beacon signal detected through scanning performed in step S541. FIG. 6J illustrates an example of a screen that is displayed on the display unit 106 as result of AP searching. On the screen illustrated in FIG. 6J, ESSIDs "NETWORK-100" and "NETWORK-102" are detected. In a case where an "update" button 619 is selected, the control unit 101 searches again for an AP existing in the surrounding area, and displays a screen similar to that in FIG. 6J. In this embodiment, only two APs existing in the surrounding area are displayed. If three or more APs are found, the three or more APs existing in the surrounding area may be displayed by scrolling the screen. At this time, with reference to "connection order" in the network participation parameter section 420, the APs corresponding to the networks in which the digital camera 100 has participated before may be sorted in order in which the digital camera 100 has participated recently. Alternatively, the APs may be sorted in descending order of radio field intensity.

In step S543, the control unit 101 judges whether or not to participate in a wireless LAN network. Referring to FIG. 6J, if a button 621 or 622 indicating the detected AP is selected, the control unit 101 judges to participate in a wireless LAN network, the process proceeds to step S546, and the control unit 101 performs a process of participating in the selected wireless LAN network. If a button 620 for providing an instruction to form a wireless LAN network is selected, the control unit 101 judges not to participate in a wireless LAN network, and the process proceeds to step S544.

Steps S544 and S545 are similar to steps S504 and S505, and thus the description thereof is omitted.

In step S546, the control unit 101 participates in the wireless LAN network corresponding to the AP selected in step S543, and the process proceeds to step S547. At this time, if the selected AP is an AP whose parameter is stored in the network participation parameter section 420, the control unit 101 may participate in the wireless LAN network without causing the user to input an encryption key or the like. Alternatively, an encryption key that is stored as an initial value for an input screen for the encryption key may be input. Also, regarding an IP address acquisition method and a DNS acquisition method, a method that is stored may be used without causing the user to select a method, or the user of the digital camera 100 may be allowed to select a method again. If the selected AP is an AP whose parameter is not stored in the network participation parameter section 420, the user of the digital camera 100 may be allowed to input a necessary parameter. The IP address acquisition method and the DNS acquisition method may be input by the user of the digital camera 100 or may be set to "auto" as default.

Steps S547 to S549 are similar to steps S510 to S512, and thus the description thereof is omitted. If the control unit 101 judges in step S547 that establishment of a connection to the wireless LAN network has failed, the process proceeds to step S553, and the control unit 101 displays an error message on the display unit 106. If the control unit 101 judges in step S549 that an IP address has been successfully assigned, the process proceeds to step S550. If the control unit 101 judges that assignment of an IP address has failed, the process proceeds to step S553, and the control unit 101 displays an error message on the display unit 106.

In step S550, the control unit 101 refers to the network participation parameter section 420 and judges whether or not the network parameter of the wireless LAN network in which the digital camera 100 currently participates in has been stored. If the control unit 101 judges that the network parameter has been stored, the process proceeds to step S552, and the control unit 101 updates the network parameter. If the control unit 101 judges that the network parameter has not been stored, the process proceeds to step S551, and the control unit 101 newly stores a network parameter.

In step S551, the control unit 101 stores, in the network participation parameter section 420, the parameter of the wireless LAN network in which the digital camera 100 currently participates in, and the process proceeds to step S521.

For example, if the network "NETWORK-102" is selected from the list of APs displayed in step S542, "NETWORK-102" is stored in the field of ESSID, and proper values are stored in the fields of authentication scheme, type of code, encryption key, channel, IP address acquisition method, and DNS acquisition method in the column 423 of the network participation parameter number 3. Also, it is necessary to set the largest value for connection order, and thus "7" is stored.

In step S552, the control unit 101 updates the network participation parameter section 420 by using the parameter of the wireless LAN network in which the digital camera 100 currently participates, and the process proceeds to step S521. For example, if the network "NETWORK-101" is selected from the list of APs displayed in step S542, it is necessary to set the largest value for connection order of the network participation parameter number 2 (422), and thus the value is updated to "7".

Step S553 is similar to step S513, and thus the description thereof is omitted. After an error message is displayed in step S553, if a notification indicating that the error message has been read is received from the user of the digital camera 100, process proceeds to step S541.

Process of Establishing Connection for Second or Later Time

Figure 7B:
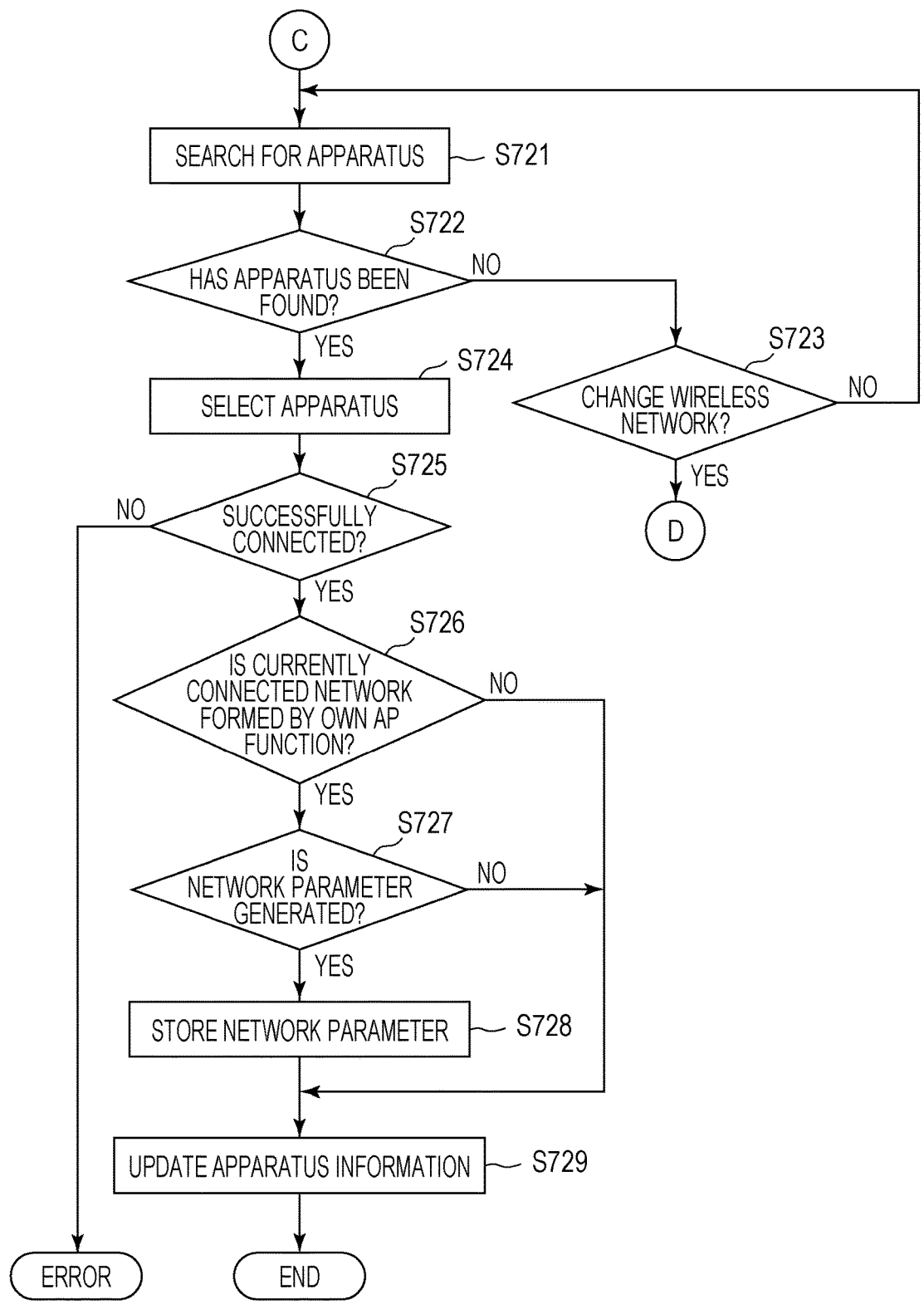
FIG. 7B is a flowchart illustrating a process performed by the communication apparatus according to the first embodiment.
Figure 7C:
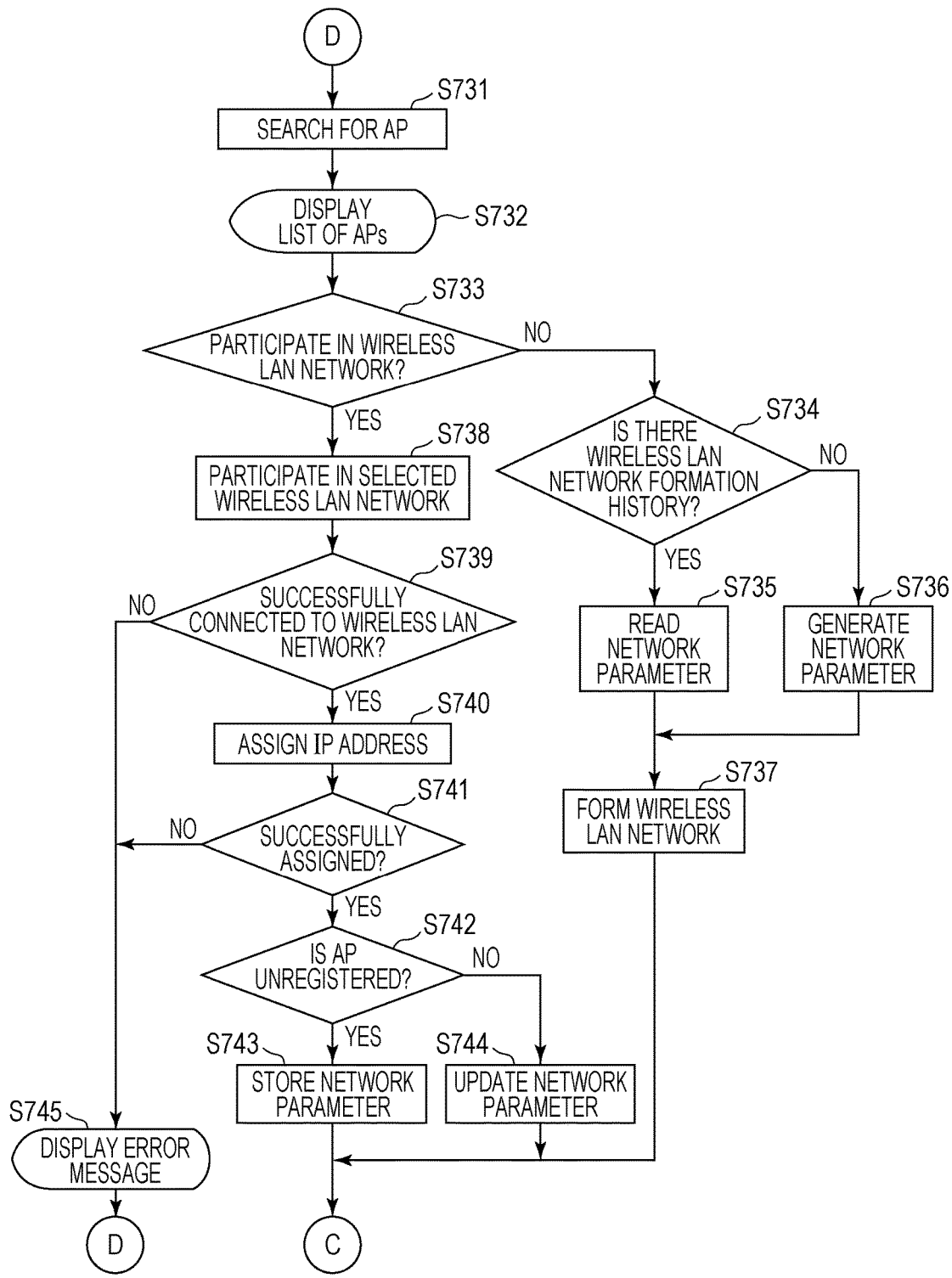
FIG. 7C is a flowchart illustrating a process performed by the communication apparatus according to the first embodiment.

With reference to FIGS. 7A to 7C, a description will be given of a process performed by the digital camera 100 to establish a connection to an apparatus including the mobile phone 200 for a second or later time.

First, with reference to FIG. 7A, a description will be given of a process performed by the digital camera 100 to establish a connection (participate in/form a network) for a second or later time.

In step S701, the control unit 101 accepts selection of an apparatus to be connected from the user of the digital camera 100. As described above, if any one of the apparatuses that are already registered and indicated by the buttons 608 and 609 illustrated in FIG. 6B is selected, a connection process is performed for a second or later time. Here, as the already registered apparatuses, a list of apparatuses whose information is stored in the connected apparatus information section 410 is displayed. For example, in a case where the apparatus information is in the state illustrated in FIG. 4, the already registered apparatuses are "mobilePhone1" (411), "mobilephone2" (412), and "PC1" (413). Here, the "mobile phone" button 602 is selected in FIG. 6A, and thus only "mobilePhone1" (411) and "mobilePhone2" (412), which are apparatuses whose type is mobile phone, are displayed as the already registered apparatuses.

Steps S702 to S704 are similar to steps S501 to S503 in FIG. 5, and thus will be briefly described.

If the control unit 101 judges in step S702 that a parameter is not stored in the network participation parameter section 420, the process proceeds to step S705. On the other hand, in step S704, the control unit 101 judges whether or not the AP whose parameter is stored in the network participation parameter section 420 is found through AP searching in step S703. If the control unit 101 judges that the AP is found, the process proceeds to step S709. If the control unit 101 judges that the AP is not found, the process proceeds to step S705.

In step S705, the control unit 101 refers to the connected apparatus information section 410, and judges whether or not there is a wireless network formation history associated with the apparatus selected in step S701. For example, in a case where the connected apparatus information section 410 is in the state illustrated in FIG. 4, if "mobilePhone1" (411) is selected in step S701, a network formation parameter number is associated, and thus the process proceeds to step S706. On the other hand, if "mobilePhone2" (412) is selected in step S701, a network formation parameter number is not associated, and thus the process proceeds to step S707.

In step S706, the control unit 101 refers to the connected apparatus information section 410, and specifies the wireless network formation parameter number associated with the apparatus selected in step S701. Then, the control unit 101 refers to the network formation parameter section 430 and reads out a network formation parameter, and the process proceeds to step S708. For example, in a case where the connected apparatus information section 410 and the network formation parameter section 430 are in the state illustrated in FIG. 4, if "mobilePhone1" (411) is selected in step S701, the network formation parameter number 1 (431) is associated. Thus, the control unit 101 refers to the network formation parameter number 1 (431) in the network formation parameter section 430, and reads out the ESSID "CAMERA-123" and the encryption key "12345678".

Step S707 is similar to step S504 in FIG. 5A, and thus the description thereof is omitted. In step S708, the control unit 101 forms a wireless LAN network by using the network parameter read out in step S706 or the network parameter generated in step S707. That is, the control unit 101 performs a process of newly forming a network as a simplified AP and causing a connection partner to participate in the network. The process performed thereafter is similar to step S505 in FIG. 5, and thus the description thereof is omitted. The process proceeds to step S721. The intention of forming a wireless LAN network by referring to the network formation parameter section 430 if it is judged in step S705 that there is a wireless network formation history is as follows. That is, in the case of establishing a connection with an apparatus for a second or later time, if the digital camera 100 forms the same network as the preceding time, the apparatus to be connected is capable of performing a connection process by using a network parameter stored therein, and a process of causing the user to input an encryption key and so forth again can be omitted.

Steps S709 to S716 are similar to steps S506 to S513 in FIG. 5A, and thus the description thereof is omitted. If the control unit 101 judges in step S713 that establishment of a connection to a wireless LAN network has failed, the process proceeds to step S716. If the control unit 101 judges in step S715 that an IP address has been successfully assigned, the process proceeds to step S721. If the control unit 101 judges that assignment of an IP address has failed, the process proceeds to step S716. After an error message is displayed in step S716, if a notification indicating that the error message has been read is received from the user of the digital camera 100, the process proceeds to step S731.

With reference to FIG. 7B, a description will be given of a process performed by the digital camera 100 to establish a connection to an apparatus for a second or later time.

Referring to FIG. 7B, in step S721, the control unit 101 searches for the apparatus selected in step S701 from among connectable apparatuses in the same network. The details of the search method are similar to those in step S521 in FIG. 5B, and thus the description thereof is omitted. The control unit 101 refers to the connected apparatus information section 410, and searches for a connectable apparatus whose UUID matches that of the apparatus selected in step S701. For example, in a case where the connected apparatus information section 410 is in the state illustrated in FIG. 4, if "mobilePhone1" (411) is selected in step S701, a connectable apparatus whose UUID is "0000-ABCD-EFGH" is searched for. FIGS. 6D and 6F illustrate an example of screens that are displayed on the display unit 106 during searching for a connectable apparatus.

In step S722, the control unit 101 judges whether or not the apparatus selected in step S701 has been found from among connectable apparatuses. If the control unit 101 judges that the apparatus selected in step S701 has been found, the process proceeds to step S724. If the control unit 101 judges that the apparatus selected in step S701 has not been found, the process proceeds to step S723.

Step S723 is similar to step S523 in FIG. 5B, and thus the description thereof is omitted. If the control unit 101 judges in step S723 that an instruction to change the network is provided, the process proceeds to step S731. If the control unit 101 judges that an instruction to change the network is not provided, the process proceeds to step S721.

In step S724, the control unit 101 transmits a connection request to the mobile phone 200 by using the UUID of the apparatus selected in step S701, and starts a process for establishing a connection with the selected apparatus. The process proceeds to step S725. The details of the process of establishing a connection are similar to those in step S526 in FIG. 5B, and thus the description thereof is omitted. FIG. 6H illustrates an example of a screen that is displayed on the display unit 106 in a case where "mobilePhone1" is selected in step S701.

Steps S725 to S726 are similar to steps S527 to S528 in FIG. 5B, and thus the description thereof is omitted. If the control unit 101 judges in step S726 that the wireless network is a network formed by the digital camera 100, the process proceeds to step S727. If the control unit judges that the wireless network is not a network formed by the digital camera 100, the process proceeds to step S729.

In step S727, the control unit 101 judges whether or not a network parameter is generated in step S705. If the control unit 101 judges that a network parameter is generated, the process proceeds to step S728, and the control unit 101 stores the network parameter. If the control unit 101 judges that a network parameter is not generated, the process proceeds to step S729.

In step S728, the control unit 101 stores the parameter of the network formed by the digital camera 100 in the network formation parameter section 430, and ends the second connection. For example, when the network formation parameter section 430 is in the state illustrated in FIG. 4, in a case where "mobilePhone2" is selected in step S701, the ESSID of the network formed by the digital camera 100 is "CAMERA-456", and the encryption key is "11112222", the ESSID "CAMERA-456" and the encryption key "11112222" are stored in the column 432 of the network formation parameter number 2 in the network formation parameter section 430.

In step S729, the control unit 101 updates the parameter of the connected apparatus in the connected apparatus information section 410. For example, in a case where the connected apparatus information section 410 is in the state illustrated in FIG. 4, if "mobilePhone2" is selected in step S701, the control unit 101 stores a value "7", which is larger than the values of the connection order of other connected apparatus information, in the field of "connection order" in the column 412 of the connected apparatus information number 2 in the connected apparatus information section 410. If the control unit 101 generates a network parameter in step S727, the control unit 101 stores the network formation parameter number in the column 412 of the connected apparatus information number 2 in the field of "network formation parameter number" in the network formation parameter section 430 stored in step S728. Accordingly, in a case where a network is formed for "mobilePhone2" next time to establish a connection, the same wireless LAN parameter can be used.

With reference to FIG. 7C, a description will be given of a process of establishing a connection for the second time (changing a network) performed by the digital camera 100.

Referring to FIG. 7C, steps S731 to S733 are similar to steps S541 to S543 in FIG. 5C, and thus the description thereof is omitted. If the control unit 101 judges in step S733 to participate in a wireless LAN network, the process proceeds to step S738. If the control unit 101 judges not to participate in a wireless LAN network, the process proceeds to step S734.

Steps S734 to S737 are similar to steps S705 to S708, and thus the description thereof is omitted. After step S737, the process proceeds to step S721.

Steps S738 to S745 are similar to steps S546 to S553 in FIG. 5C, and thus the description thereof is omitted. After step S743, the process proceeds to step S721. After step S744, the process proceeds to step S721. After an error message is displayed in step S745, if a notification indicating that the error message has been read is received from the user of the digital camera 100, the process proceeds to step S731.

As described above, the digital camera 100 according to this embodiment starts a process of participating in an appropriate network after designating an apparatus having a connection history. After participating in the network, the digital camera 100 establishes a connection to the designated apparatus. From the viewpoint of the user, if the user selects an apparatus to be connected, a series of processes for participating in a network and establishing a connection to the apparatus are appropriately performed, and thus operability can be enhanced.

Second Embodiment

Hereinafter, a process of the digital camera 100 according to a second embodiment will be described.

In the above-described first embodiment, a description has been given of an example in which two data communication modes are available between the digital camera 100 and the mobile phone 200, and appropriate control is performed in accordance with these data communication modes. However, depending on the hardware configuration, usage manner, and usage environment of an apparatus to be connected, it may be better to change a method for searching for an AP as necessary. As described above in the first embodiment, AP searching is performed by detecting, by the individual apparatuses that participate in the same wireless LAN network, a beacon signal transmitted from the AP. However, it is possible that a single search process is insufficient to find a desired AP, depending on timing, signal strength, the number of wireless LAN networks, or other factors.

The control unit 101 searches for an AP in step S502 in FIG. 5A. Subsequently, in step S503, the control unit 101 judges whether or not a registered AP exists. However, even if the control unit 101 judges in step S503 that a registered AP is not found, the process may return to step S502, and AP searching may be performed again. Note that, in a situation where a registered AP is not actually found, if AP searching is performed again and again, the processing time becomes longer accordingly. For this reason, an upper limit of the number of search processes may be set, for example, if no APs are found by performing searching three times, the process proceeds to steps S504 and S505 (a wireless network formation process) without returning to step S502. Accordingly, even if a desired AP is not found through a single search process due to the timing or signal strength of AP searching, the search process is repeated up to the upper limit. Thus, a connection to a desired wireless LAN network can be established.

Furthermore, a flow of a process may be changed depending on an ambient network environment. The possibility of existence of an AP that is not found through a single search process is described above. However, it is often the case that some APs are found but some APs are not found, and it is not often the case that an AP is not found though there are APs that can be found in the surrounding area.

Thus, the control unit 101 searches for an AP in step S502, and, if an access point is not found, the process does not return to step S502 (a search process), and may proceed to steps S504 and S505 (a wireless network formation process). Accordingly, under the environment in which no access points exist around the digital camera 100, that is, under the environment in which no wireless LAN networks exist, the process can proceed to steps S504 and S505 (a wireless network formation process) without an unnecessary search process.

This is the same in the AP searching in step S541 in FIG. 5C. There is also a possibility that a single search process is insufficient to find all APs. Thus, for example, if a search process is performed three times and if a list of APs that are found is displayed in step S542, more accurate information can be provided to the user.

Depending on the usage purpose of the user, it may be better to appropriately change a connection sequence.

As described above in the first embodiment, a wireless LAN network formed by the digital camera 100 according to this embodiment does not have a communication function for an external network, such as the Internet. Thus, the mobile phone 200 that participates in the wireless LAN network formed by the digital camera 100 is incapable of transmitting data to the Internet or the like via a simplified AP. Thus, for a user whose main purpose is to connect to an external network such as the Internet, it is not necessary to perform the wireless network formation process in steps S504 and S505 in FIG. 5A. Also, in a case where there are no registered APs in step S501 and in a case where no registered APs are found in step S503, the process does not proceed to steps S504 and S505. In this case, the process proceeds to step S541 in FIG. 5C (branched from step S501) or step S542 (branched from step S503).

In step S543, the user is capable of selecting participating in an unregistered wireless network or starting a wireless network formation process. Thus, a user whose main purpose is to connect to an external network such as the Internet is capable of participating in a wireless network of an unregistered AP without performing a wireless network formation process. Also, the user may select a connection through a wireless network formation process.

Note that the control unit 101 may judge whether the main purpose of a user is to connect to an external network such as the Internet by inquiring of the mobile phone 200, or may perform switching in response to an input from the user of the digital camera 100.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-286677, filed Dec. 28, 2012, which is hereby incorporated by reference herein in its entirety.

What is claimed is:

1. A communication apparatus that is to be connected to an external apparatus via a network, comprising:
a processor;
a communication interface; and
a memory coupled to the processor storing instructions that, when executed by the processor, cause the processor to function as:
a participation unit configured to participate in a network formed by an external access point;
a forming unit configured to form a network, with the communication apparatus as an access point;
a storing unit configured to store, in the memory information on one or more networks in which the communication apparatus has participated before, and information on one or more external apparatuses to which the communication apparatus has been connected before, wherein the information on one or more networks include information on a first network previously formed by the forming unit, and information on a second network previously formed by the external access point;
an accepting unit configured to accept selection, before participating in a network, on the basis of the information on the one or more external apparatuses stored in the memory, of an external apparatus for which communication via the communication interface is to be established;
and
a determining unit configured to, in a case where the information on the second network is not stored in the memory when selection is accepted by the accepting unit, determine to use the first network based on the information on the first network.

2. The communication apparatus according to claim 1, further comprising:
a searching unit configured to search for, in a case where selection is accepted by the accepting unit, a network in the area surrounding the communication apparatus via the communication interface; and
a judging unit configured to judge whether or not the second network corresponding to the information on the second network stored in the memory exists, by comparing information on the network that is searched for by the searching unit with the information on the second network stored in the memory.

3. The communication apparatus according to claim 2, wherein the participation unit participates in a network in which the participation unit has participated most recently among networks that are judged to exist by the judging unit.

4. The communication apparatus according to claim 2, further comprising:
a display unit configured to display an operation screen that is used for establishing a connection via the network formed by the external access point on a display, in a case where the judging unit judges that a network corresponding to the information on the second network stored in the memory does not exist when selection is accepted by the accepting unit.

5. The communication apparatus according to claim 1, wherein the forming unit newly forms a network in a case where either the information on the first network or the information on the second network is not stored in the memory.

6. The communication apparatus according to claim 1, wherein the communication apparatus is an image capturing apparatus.

7. The communication apparatus according to claim 1, wherein the communication apparatus is a mobile phone.

8. The communication apparatus according to claim 1, wherein the communication apparatus is a tablet device.

9. A method for controlling a communication apparatus connected to an external apparatus via a network, comprising:
participating in a network formed by an external access point via a communication interface;
forming a network, with the communication apparatus as an access point;
storing, in a memory, information on one or more networks in which the communication apparatus has participated before, and information on one or more external apparatuses to which the communication apparatus has been connected before, wherein the information on one or more networks include information on a first network formed in the forming step, and information on a second network, formed by the external access point;
accepting selection, before participating in a network, on the basis of the held information on the one or more external apparatuses stored in the memory, of an external apparatus for which communication via the communication interface is to be established; and
in a case where the information on the second network is not stored in the memory when selection is accepted by the accepting unit, determining to use the first network based on the held information on the first network stored in the memory so as to form the first network by the forming unit without searching for a network in an area surrounding the communication apparatus.

10. The method according to claim 9, further comprising:
searching for, in a case where accepting selection is accepted, a network in the area surrounding the communication apparatus via the communication interface; and
judging whether or not the second network corresponding to the information on the second network stored in the memory exists, by comparing information on the network that is searched for by the searching with the information on the second network stored in the memory.

11. The method according to claim 10, wherein the participating participates in a network in which the participating has participated most recently among networks that are judged to exist by the judging.

12. The method according to claim 10, further comprising:
displaying an operation screen that is used for establishing a connection via the network formed by the external access point on a display, in a case where the judging judges that a network corresponding to the information on the second network stored in the memory does not exist when selection is accepted by the accepting.

13. The method according to claim 9, wherein the forming includes newly forming a network in a case where either the information on the first network or the information on the second network is not stored in the memory.

14. The method according to claim 9, wherein the communication apparatus is one of an image capturing apparatus, a mobile phone and a tablet device.

15. A non-transitory computer-readable recording medium storing a program of instructions for causing a computer to function as a communication apparatus, the communication apparatus comprising:
a participation unit configured to participate in a network formed by an external access point;
a forming unit configured to form a network, with the communication apparatus as an access point;
a storing unit configured to store, in a memory information on one or more networks in which the communication apparatus has participated before, and information on one or more external apparatuses to which the communication apparatus has been connected before, wherein the information on one or more networks include information on a first network previously formed by the forming unit, and information on a second network previously formed by the external access point;
an accepting unit configured to accept selection, before participating in a network, on the basis of the information on the one or more external apparatuses stored in the memory, of an external apparatus for which communication via the communication interface is to be established; and
a determining unit configured to, in a case where the information on the second network is not stored in the memory when selection is accepted by the accepting unit, determine to use the first network based on the information on the first network.

16. The non-transitory computer-readable recording medium according to claim 15, further comprising:
a searching unit configured to search for, in a case where selection is accepted by the accepting unit, a network in the area surrounding the communication apparatus via the communication interface; and
a judging unit configured to judge whether or not the second network corresponding to the information on the second network stored in the memory exists, by comparing information on the network that is searched for by the searching unit with the information on the second network stored in the memory.

17. The non-transitory computer-readable recording medium according to claim 16, further comprising:
a display unit configured to display an operation screen that is used for establishing a connection via the network formed by the external access point on a display, in a case where the judging unit judges that a network corresponding to the information on the second network stored in the memory does not exist when selection is accepted by the accepting unit.

18. The non-transitory computer-readable recording medium according to claim 15, wherein the forming unit newly forms a network in a case where either the information on the first network or the information on the second network is not stored in the memory.

19. The non-transitory computer-readable recording medium according to claim 15, wherein the communication apparatus is one of an image capturing apparatus, a mobile phone and a tablet device.

\* \* \* \* \*